Aug. 7, 1945.　　W. SCHAELCHLIN ET AL　　2,381,313
STABILITY CONTROLLED SHIP PROPULSION SYSTEM
Filed Feb. 10, 1944
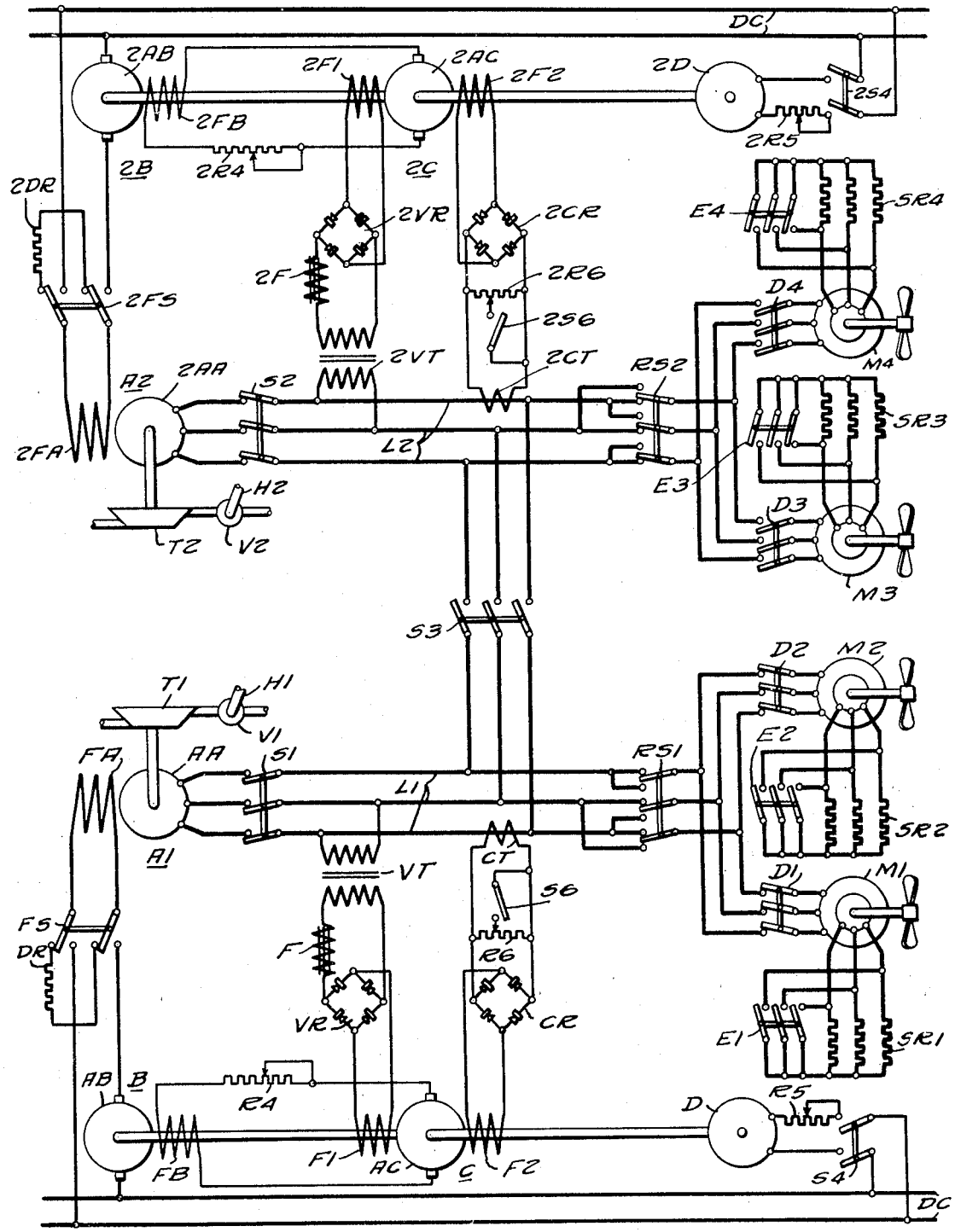
WITNESSES:
INVENTORS
Walter Schaelchlin and
Earl H. Hornbarger.
BY
Paul E. Friedemann
ATTORNEY Patented Aug. 7, 1945

2,381,313

UNITED STATES PATENT OFFICE 2,381,313

STABILITY CONTROLLED SHIP PROPULSION SYSTEM

Walter Schaelchlin, Pittsburgh, and Earl H. Hornbarger, Edgewood, Pa., assignors to Westinghouse Electric Corporation, East Pittsburgh, Pa., a corporation of Pennsylvania Application February 10, 1944, Serial No. 521,808

11 Claims. (Cl. 172—8)

Our invention relates to stability control means in electric power systems having one or several alternators of adjustable speed and one or several alternating-current motors connected with the alternators for operation at a speed determined by the alternator speed adjustment. More particularly, the invention concerns electric ship propulsion systems of the just-mentioned type.

It is an object of our invention to provide a stability regulated system of the above-mentioned type that combines reliable and quick-responsive control operation with safety from hunting.

Another object of the invention, in conjunction with the foregoing, is to devise a stability controlled power system of the type referred to, whose control operation is fully automatic, so as to obviate the necessity of supervision or control by an attendant under normal operating conditions.

A further object of our invention is the provision of a stability control for ship propulsion systems of the above-mentioned type that affords, an improved flexibility of operation and an extremely high velocity of response, so as to operate satisfactorily under quick-changing and exacting conditions such as occurring during crash stop maneuvers.

The invention aims also at achieving the above-mentioned objects with the aid of electric control devices which require no contactors or the like apparatus in the stability controlling circuits proper, in order to reduce the danger of failure and sensitivity to shocks.

In order to attain these objects, and in accordance with one of the features of the invention, we supply a variable speed alternator of the power system with a direct-current field excitation which is variable and reversible in dependence upon the load and flux ratio of the alternator. According to another feature of the invention, this excitation is supplied or controlled by an auxiliary generator with at least two differentially acting field windings, one being energized in response to the alternator load and the other in response to the alternator flux (voltage per cycle). In still another aspect of the invention, the direct current field excitation of the alternator is composed of two voltage components. One of the component voltages is substantially constant while the other is produced by a booster generator so as to be variable and reversible in dependence upon the ratio or differential value of the load current and flux (voltage per cycle) of the alternator.

According to another feature of the invention, the just mentioned booster generator is controlled by a field excitation which is obtained from a control generator with two differentially acting field windings. One of these windings is energized by a voltage varying in response to the alternator load current, so as to boost the above-mentioned constant voltage component accordingly. The other field winding of the control generator is energized by a voltage which varies in response to the alternator flux and tends to buck the constant voltage component of the alternator field excitation.

These and other objects and features of our invention will be apparent from the embodiment illustrated in the drawing, in conjunction with the appertaining description following hereinafter.

The drawing shows a straight line circuit diagram of a ship propulsion system according to the invention. The system is provided with two generator sets and four propulsion motors, for instance, a forward generator and an after generator for energizing two starboard motors and two port motors. The forward generator set has a prime mover, for instance, a turbine T1 in driving connection with an alternator A1, which is provided with a speed regulator, shown schematically as a steam admission valve V1 with a control handle or lever H1 for setting the valve in accordance with the desired turbine speed. Hence, the valve and lever permit adjusting the desired frequency of the alternating-current generated by the alternator A1.

The armature AA of the alternator A1 is connected through a set-up switch S1 with the propulsion line L1. A reversing switch RS1 connects the line L1 with the starboard motors M1 and M2 through disconnect switches D1 and D2. The two motors are of the wound rotor type and have their secondary resistance circuit SR1 and SR2 connected with a control contactor E1 and E2, respectively.

The after generator set has a turbine T2 provided with a speed regulating admission valve V2 which is set by means of a speed-regulating handle H2 and connected with an alternator A2. The output terminals of this alternator are connected to the propulsion line L2 through a set-up switch S2. A reversing switch RS2 connects the line L2 with the two port motors M3 and M4, both being also of the wound rotor type. The secondary resistor circuits SR1 and SR2 of these port motors and the appertaining contactors E3 and E4 are similar to those of the starboard motors. Two disconnect switches D3 and D4, respectively, are arranged between the port motors and the reversing switch RS2.

A third set-up switch S3 interconnects the two propulsion lines L1 and L2. By means of the three set-up switches S1, S2 and S3 and the disconnect switches D1, D2, D3 and D4, each alternator can be connected with one, two, three, or all of the propulsion motors. Under normal conditions, the disconnect switch S3 is kept open, so that the alternator A1 feeds one or both of the motors M1 or M2, while the alternator A2 serves to energize motors M3 and M4. Interlocks may be provided in order to prevent the two alternators from being simultaneously connected to the two lines.

Each of the two alternator-motor groups is provided with a stability control system of which only the control system appertaining to the alternator A1 and line L1 is hereinafter described in detail because the second control system is designed and operative in a similar manner. The reference characters applied to the second stability control system are similar to those of corresponding parts of the first system except that the prefix 2 has been added to the reference characters of the second system. Thus, for instance, TR, CT and R4 refer to parts of the first system while 2TR, 2CT and 2R4 indicate corresponding parts of the second system. Keeping this in mind, the following description of one of the stability control systems can readily be applied to the other system.

Referring to the lower portion of the drawing, the field winding FA of alternator A1 is connected to a field switch FS which, when open, connects a discharge resistor DR across the field winding. When the field switch FS is closed, the winding FA is in series-connection with a direct-current source DC of constant voltage and with the armature AB of a booster generator B. The direct-current output voltage of this booster generator is variable and reversible, so as to boost or buck the voltage supply by the direct-current source DC. In order to control the magnitude and direction of the booster voltage, the field winding FB of the booster generator is connected to the armature AC of a control generator C. The two armatures AB and AC are mounted on a common shaft which is driven by any suitable motor of substantially constant speed. In the illustrated embodiment, the motor D is shown as being energized from the current source DC through a switch S4 and an adjusting rheostat R5. The adjustment of this rheostat is not changed during the normal operation of the system. Consequently, the output voltages of the armatures AC and AB depend entirely on the energization of the appertaining field windings.

The control generator C is provided with two differentially acting field windings F1 and F2. The winding F1 is of the nature of a shunt winding, and is connected through a rectifier VR and a reactor F with the secondary of a voltage transformer VT whose primary is connected across two leads of the propulsion line L1. Due to this connection, the excitation of field winding F1 depends upon the voltage of the alternator A1. However, the reactance value of the coil F is chosen so large that the degree of excitation is essentially proportional to the alternator volts per cycle throughout the whole available speed range. The polarity of field winding F1 or its excitation is so chosen that an increase in excitation tends to cause the booster generator B to counteract the constant direct-current voltage increasingly and, hence, to reduce the excitation of the alternator field winding FA.

The second field winding F2 of the control generator C has opposite polarity, so that an increase in its excitation tends to boost the field voltage of the alternator. The winding F2 is connected through a rectifier CR with a current transformer CT measuring the current intensity in the propulsion line L1.

Two different adjusting means are provided for securing a proper alternator excitation under the expected operating conditions of the propulsion system. One of these adjusting means consists of a series resistor R4 in the field circuit of the booster generator B. This resistor serves to limit the output of the control generator C. The second adjusting means consists of a resistor R6 in shunt connection with the current transformer CT. The sliding tap of this resistor is adjusted so as to produce the desired full-load excitation of the alternator field when the alternator runs at full load and full speed. A switch S6 is connected across part of the resistor R6 for a purpose to be described in a later place.

In order to facilitate understanding the operation of the system, some numerical examples are mentioned in the following which permit a comparison of the approximate current and voltage conditions occurring in the system under different conditions or stages of operation or adjustment. It will be understood, however, that these numerical values are mentioned only for the purpose of exemplification, and that a system according to the invention will operate similarly with different ratings of the respective machines or circuit devices.

When the set-up switches S1, S3 and the disconnect switches D1 and D2 are set for energizing the two motors M1 and M2 from the alternator A1, the operation is started, for instance, by first adjusting the prime mover T1 to 20% of its normal speed and then starting the two motors by reducing the resistance of their secondary circuits until the motors are on full speed. At the beginning of the motor operation, the high starting current in connection with the low line voltage will cause the excitation of control field winding F2 to exceed that of the shunt type winding F1. As a result, the booster field winding FB is strongly excited with such a polarity that the output voltage of the booster will produce maximum boosting action in opposition to the constant voltage of, say, 240 volts of source DC. Consequently, the alternator field winding FA is at first energized with maximum current, for instance, 500 amperes. As the propulsion motor accelerates, the magnitude of the voltage generated by the control generator C will gradually decline and then automatically reverse. When the propulsion motor has reached its synchronous speed in accordance with the above-mentioned 20% speed of the alternator, the booster generator will buck the line voltage and reduce the alternator field excitation, for instance, to approximately 100 amperes as compared with the above-mentioned initial value of 500 amperes. At this speed, the voltage per cycle of the alternator current is reduced to about 75% of normal in order to reduce the losses in the alternator field and for keeping down the magnetizing current of the propulsion motor.

In order to increase the motor speed after completion of the just-mentioned starting operation, the speed regulator V1 of turbine T1 is adjusted to a higher turbine speed. The propeller speed of the propulsion motor increases accordingly, and so does the load current in line L1. During the period of speed increase, the excitation of the series type field winding F2 of the control generator C increases more rapidly than that of the shunt type field winding F1. As a result, the alternator excitation is boosted in order to maintain a proper torque margin. At full load and full speed, the control generator will provide about 200 amperes excitation in winding FA as compared with the above-mentioned current values of 500 and 100 amperes. This corresponds to approximately 40 volts bucking action of the booster generator B as compared with the constant voltage of 240 volts of source DC.

In the case of a crash stop maneuver, the steam flow to the turbine is shut down to reduce the turbine and alternator speed to idling. The motor current decreases very rapidly. In consequence, the effect of the field winding F1 on the output voltage of generator C exceeds that of the field winding F2 so that a strong bucking action of the booster generator B is produced. This reduces the alternator excitation to a minimum before the field switch FS and the reversing switch E1 are opened. When thereafter the reversing switch E1 is closed in the opposite direction, and the field switch FS is reclosed, the high starting current of the propulsion motor produces maximum excitation of the series type field F1 which, in turn, boosts the alternator excitation to about 500 amperes. Since the reversing torque is very high, the motor decelerates and gains speed in the opposite direction very rapidly, thereby reducing the alternator excitation gradually as the motor current decreases.

The foregoing explanation of the operation shows that the stabilizing control effect is automatic for any operating condition and does not require attendance by the operator. The speed of response of the control system is extremely great because any change of load due to acceleration of the turbine, turning of the ship, or other reasons, causes an immediate correction of the alternator excitation. At low speed, the control generator tends to maintain approximately constant volts per cycle while at full speed a load increase of, for instance, 20% would increase the generator voltage about 25%. This relation of gain or amplification between low speed and high speed is inherent in the characteristic of rotating control generators of the type represented by the generators C and D. The response is especially quick at high speed, and this is another advantage of the control system since the inherent torque margin is lower at high speed than at low speed.

When operating the propulsion plant with one alternator and four motors, it is desirable to reduce the voltage somewhat in order to reduce overheating of the alternator. In order to accomplish this, the switch S6 across part of the shunt resistor R6 is closed, thereby diminishing the boosting action. The switch S6 may be tied up with the set-up switches by means of suitable interlocks (not shown), so that it is actuated automatically in dependence upon the selected setting of the set-up switches.

It will be understood that the speed controls H1 and H2, as well as the set-up, reversing and disconnect switches, are preferably arranged at a single control stand and in juxtaposition to one another so as to facilitate their actuation by the operator. Since such control stands and appertaining auxiliary devices, such as relays and interlocks, are well known as such and not subject-matter of the invention proper, they are not illustrated in the drawing.

While in the above-described example of an invention we have shown a booster generator in conjunction with a direct current source of constant voltage, it will be understood that the above-explained principle of stability control can also be performed without a constant voltage source so that the reversible output voltage of the generator is the only source of excitation for the field winding of the alternator.

It will be obvious to those skilled in the art that systems in accordance with our invention can be modified as to details without departing from the above-stated principles, features, objects and advantages. We, therefore, wish this specification to be understood as illustrative and not in a limiting sense.

We claim as our invention:

1. An electric power system comprising a variable speed alternator, an alternating-current motor, circuit means connecting said motor with said alternator for energizing said motor to run at a speed in accordance with that of said alternator, a field winding forming part of said alternator, a direct-current source of substantially constant voltage and a direct-current booster generator series connected with said field winding for energizing the latter, said booster generator having a booster field winding for controlling its output voltage, a control generator connected to said booster field winding for providing variable excitation therefor, said control generator having two differentially acting control field windings, and variable energizing means connected between each of said control field windings and said circuit means for exciting said control field windings differentially in dependence upon the flux and load respectively of said alternator.

2. An electric power system comprising a variable speed alternator, an alternating-current motor, circuit means connecting said motor with said alternator for energizing said motor to run at a speed in accordance with that of said alternator, a field winding forming part of said alternator, a generator connected with said alternator field winding and having a generator field winding for controlling the alternator field excitation, a control generator connected to said generator field winding for providing variable and reversible excitation therefor and having two differentially acting control field windings arranged and rated for determining by their resultant energization the polarity and magnitude of said excitation, current-responsive energizing means disposed between said circuit means and one of said control field windings for energizing the latter in dependence upon the load current of said alternator, and voltage-responsive energizing means connected between said circuit means and said other control field winding and including voltage limiting reactance means for energizing said other control field winding in dependence upon the volts per cycle of said alternator.

3. An electric power system comprising a variable speed alternator, an alternating-current motor, circuit means connecting said motor with said alternator for energizing said motor to run at a speed in accordance with that of said alternator, a field winding forming part of said alternator, a generator having an armature connected with said field winding and a field winding for controlling the voltage of said armature, a control generator having a single exterior armature circuit connected to said generator field winding for providing reversible excitation therefor, said control generator having two differentially acting control field windings arranged and rated for determining by their resultant energization the polarity and magnitude of said excitation, a current transformer connected with said circuit means, rectifier means connecting said current transformer with one of said control field windings for energizing the latter in dependence upon the load current of said generator, a voltage transformer connected with said circuit means, rectifier means connecting said voltage transformer with said other control field winding, and a saturable reactor interposed between said voltage transformer and said rectifier for energizing said other control field winding in dependence upon the volts per cycle of said alternator.

4. An electric power system comprising a variable speed alternator, an alternating-current motor, circuit means connecting said motor with said alternator for energizing said motor to run at a speed in accordance with that of said alternator, a field winding forming part of said alternator, a generator having an armature connected with said field winding and a field winding for controlling the voltage of said armature, a control generator having a single exterior armature circuit connected to said generator field winding for providing it with reversible excitation of variable magnitude, said control generator having two differentially acting control field windings for reversing the armature voltage of said generator depending upon the excitation ratio of said control field windings, current-responsive energizing means disposed between said circuit means and one of said control field windings for energizing the latter in dependence upon the load current of said alternator, and voltage-responsive energizing means connected between said circuit means and said other control field winding for energizing the latter in dependence upon the flux of said alternator.

5. An electric ship-propulsion system comprising a prime mover having speed control means, an alternator mechanically connected with said prime mover, an alternating-current propulsion motor, circuit means for connecting said alternator with said motor to operate the latter at variable speed in dependence upon that of said prime mover, a field winding forming part of said alternator, a direct-current source of substantially constant voltage and a direct-current booster generator series connected with said field winding for energizing the latter, said booster generator having a booster field winding for controlling its output voltage so as to boost and buck respectively said constant voltage depending upon the polarity of excitation of said booster field, a control generator connected to said booster field winding for providing it with reversible exitation of variable magnitude, said control generator having two differential control field windings, current-responsive energizing means disposed between said circuit means and one of said control field windings for energizing the latter in dependence upon the load current of said alternator, and voltage-responsive energizing means connected between said circuit means and said other control field winding for energizing the latter in dependence upon the flux of said alternator.

6. An electric ship-propulsion system comprising a prime mover having speed control means, an alternator mechanically connected with said prime mover, an alternating-current propulsion motor, circuit means for connecting said alternator with said motor to operate the latter at variable speed in dependence upon that of said prime mover, a field winding forming part of said alternator, a direct-current source of substantially constant voltage and a direct-current booster generator series connected with said field winding for energizing the latter, said booster generator having a booster field winding for controlling its output voltage, current responsive energizing means disposed between said circuit means and one of said control field windings for energizing the latter in dependence upon the load current of said alternator, and voltage-responsive energizing means connected between said circuit means and said other control field winding for energizing the latter in dependence upon the voltage of said alternator, a current transformer connected with said circuit means, rectifier means connecting said current transformer with one of said control field windings for energizing the latter in dependence upon the load current of said generator, a voltage transformer connected with said circuit means, and rectifier means connecting said voltage transformer with said other control field winding.

7. An electric ship-propulsion system comprising a prime mover having speed control means, an alternator mechanically connected with said prime mover, an alternating-current propulsion motor, circuit means for connecting said alternator with said motor to operate the latter at variable speed in dependence upon that of said prime mover, a field winding forming part of said alternator, a direct-current source of substantially constant voltage connected to said field winding to provide component energization therefor, a booster generator having an armature connected with said field winding to provide another component energization therefor and including a booster field winding for varying and reversing said latter energization in order to increase and reduce respectively the total energization of said field winding depending upon the polarity of excitation of said booster field winding, a control generator connected to said booster field winding and having two differential control field windings for producing variable voltage of reversible polarity, current-responsive energizing means disposed between said circuit means and one of said control field windings for energizing the latter in dependence upon the load current of said alternator, and energizing means connected between said circuit means and said other control field winding for energizing the latter in accordance with the voltage per cycle of said alternator.

8. An electric ship-propulsion system comprising a prime mover having speed control means, an alternator mechanically connected with said prime mover, an alternating-current propulsion motor, circuit means for connecting said alternator with said motor to operate the latter at variable speed in dependence upon that of said prime mover, a field winding forming part of said alternator, a direct-current source of substantially constant voltage connected to said field winding to provide component energization therefor, a booster generator having an armature connected with said field winding to provide another component energization therefor and including a booster field winding for varying and reversing said latter energization in order to increase and reduce respectively the total energization of said field winding depending upon the polarity of excitation of said booster field winding, a control generator connected to said booster field winding and having two differential control field windings for producing a variable voltage of reversible polarity, energizing means disposed for exciting one of said control windings in dependence upon the load of said alternator and containing a current transformer connected with said circuit means, and energizing means disposed for providing excitation for said other control winding and containing a voltage transformer connected with said circuit means and a reactor between said transformer and said latter winding so that said excitation is a measure of the voltage per cycle of said alternator.

9. An electric ship-propulsion system comprising a prime mover having speed control means, an alternator mechanically connected with said prime mover, an alternating-current propulsion motor, circuit means for connecting said alternator with said motor to operate the latter at variable speed in dependence upon that of said prime mover, a field winding forming part of said alternator, a direct-current source of substantially constant voltage connected to said field winding to provide component energization therefor, a booster generator having an armature connected with said field winding to provide another component energization therefor and including a booster field winding for varying and reversing said latter energization in order to increase and reduce respectively the resultant energization of said field winding depending upon the polarity of excitation of said booster field winding, a control generator connected to said booster field winding and having two differential control field windings for producing a variable voltage of reversible polarity, energizing means disposed for exciting one of said control windings in dependence upon the load of said alternator and containing a current transformer connected with said circuit means, further energizing means disposed for providing excitation for said other control winding in dependence upon the flux of said alternator and containing a voltage transformer connected with said circuit means and a reactor between said transformer and said latter winding so that said excitation is a measure of the voltage per cycle of said alternator, and a motor mechanically connected with said booster generator and said control generator for driving them at substantially constant speed.

10. A ship-propulsion control system comprising a variable speed alternator, an alternating-current propulsion motor, circuit means connecting said alternator with said motor, a field winding on said alternator, direct-current exciting means connected to said field winding and including a generator having a field winding, a variable direct-current voltage source of reversible polarity connected to said generator field winding, and means for controlling the voltage of said source as regards magnitude and polarity in dependence upon the ratio of load to flux of said alternator, said control means having two differentially acting control circuits one of them having a current-responsive device connected with said circuit means and the other having a flux-responsive device connected with said circuit means so that the generator controlled voltage of said exciting means is high at a high load or low flux and low at a lower load or higher flux of said alternator.

11. A ship-propulsion control system comprising a variable speed alternator, an alternating-current propulsion motor, circuit means connecting said alternator with said motor, a field winding on said alternator, direct-current exciting means connected to said field winding and including a source of substantially constant voltage and a booster generator having a booster field winding, a control generator connected to said booster field winding and having two differential control field windings for producing a variable voltage of reversible polarity, current-responsive energizing means disposed between said circuit means and one of said control field windings for energizing the latter in dependence upon the load current of said alternator so as to boost said constant voltage, and voltage-responsive energizing means connected between said circuit means and said other control field winding for energizing the latter in dependence upon the flux of said alternator so as to buck said constant voltage.

WALTER SCHAELCHLIN.
EARL H. HORNBARGER.